Patented Mar. 10, 1942

2,276,176

UNITED STATES PATENT OFFICE 2,276,176

COPOLYMERS OF ESTERS OF ALPHA-METHYLENE OPEN CHAIN ALIPHATIC MONOCARBOXYLIC ACIDS WITH FROSTING DRYING OIL VARNISHES

Robert Barnett Flint and Henry Shirley Rothrock, Wilmington, Del., assignors to E. I. du Pont de Nemours & Company, Wilmington, Del., a corporation of Delaware No Drawing. Application March 29, 1940, Serial No. 326,788

20 Claims. (Cl. 260—23)

This invention relates to liquid coating compositions and, more particularly, to improvements therein with regard to frosting properties.

Interpolymerization of an ester of an alpha methylene open-chain monocarboxylic acid, e. g., methyl, ethyl, propyl, and butyl acrylate or methacrylate, with frosting drying oil, e. g., China-wood oil or oiticica oil, is so slow that gelation is apt to occur before a satisfactory degree of interpolymerization is realized. Furthermore, interpolymerization with raw, heat-bodied or blown frosting drying oil or cold-blended mixtures thereof with a varnish gum yields products which are brittle and tend to frost even after long periods of interpolymerization.

This invention has as an object novel and useful interpolymers of polymerizable esters of alpha methylene open-chain aliphatic monocarboxylic acids with frosting drying oils. Another object is the preparation from frosting drying oils of varnishes of reduced frosting tendencies. Still another object is the preparation of polymerizable acrylate or methacrylate ester-frosting drying oil interpolymers of improved properties. A further object is the provision of a process whereby the interpolymerization of polymerizable esters of alpha methylene open-chain aliphatic monocarboxylic acids with frosting drying oils may be substantially accelerated. Other objects will appear hereinafter.

These objects are accomplished by the following invention wherein a polymerizable ester of an alpha methylene open-chain aliphatic monocarboxylic acid is interpolymerized with a preformed, heat-blended frosting drying oil-varnish gum varnish, e. g., one obtained by cooking the oil with 5–50%, preferably 5–30% by weight of a natural or synthetic varnish gum or resin as subsequently defined, at temperatures, e. g., 225–230° C., substantially higher than those at which interpolymerization with the ester of an alpha methylene open-chain aliphatic monocarboxylic acid is ordinarily conducted.

By alpha methylene open-chain aliphatic monocarboxylic acid is meant an open-chain aliphatic monocarboxylic acid having a methylene group attached by means of an ethylenic double bond to a carbon in an open, straight chain, said carbon being alpha to the carboxyl.

Resinous interpolymers of esters of an alpha methylene open-chain aliphatic monocarboxylic acid, e. g. methacrylic acid, with preformed, heat-blended long China-wood oil varnishes exhibit marked improvements over products prepared by the interpolymerization of alpha methylene open-chain aliphatic monocarboxylic acid esters with the frosting drying oil or with a cold-blended mixture of frosting drying oil and varnish gum, particularly with respect to rate of interpolymer formation and resistance to frosting. The use of a frosting oil varnish, i. e., China-wood oil varnish, prepared prior to interpolymerization with the alpha methylene carboxylic acid ester by heat-blending the raw oil with a small proportion (e. g., ten per cent) of a natural or synthetic varnish gum such as rosin or "Amberol," is essential. If, in place of a preformed heat-blended varnish, merely a physical mixture of the varnish gum and raw wood oil, the raw oil itself, or a heat-bodied or air-blown China-wood oil is interpolymerized with the alpha methylene carboxylic acid ester, the rate of interpolymerization is comparatively slow; films of interpolymers obtained after long periods of reaction tend to be brittle and frost or wrinkle on drying, and the reaction mixture often gels before desirable film-forming interpolymers are obtained. In the process of the present invention it is only necessary to heat the alpha methylene carboxylic acid esters with the preformed, heat-blended drying oil-resin varnish, preferably in the presence of a catalyst such as benzoyl peroxide and an inert solvent such as toluene or xylene. Heating is continued preferably at 100–125° C. until the desired degree of interpolymerization has been obtained. In many cases, this is conveniently determined as the point where films of the resin solution upon baking for 30 minutes at 100° C., or upon air drying at room temperature, are clear and homogeneous and free from wrinkling or frosting. Rapid drying interpolymers which possess good gloss and freedom from frost or wrinkle, excellent adhesion, toughness and flexibility, are obtained in 1 to 3 hours by this procedure. After the reaction product has attained the desired properties, the resinous solution may be used as such, or preferably the excess monomer and solvent are removed by vacuum distillation, the product isolated thereby being redissolved in a suitable high-boiling solvent such as xylene or a mixture of high-boiling aromatic hydrocarbons. The resins are soluble in aromatic hydrocarbons, dioxane, aliphatic esters and ketones, and are insoluble in aliphatic hydrocarbons and alcohols.

The more detailed practice of the invention is illustrated by the following examples, wherein parts given are by weight. There are of course many forms of the invention other than these specific embodiments.

Example I

A China-wood oil—"Amberol F-7" varnish is prepared by heating 1440 parts of raw China-wood oil and 160 parts of "Amberol F-7" (an oil soluble, rosin-modified phenol-formaldehyde resin) in an open vessel during a period of 30 minutes to 225° C. with stirring. The mixture is maintained at 225-230° C. for 15 minutes and then allowed to cool to 90° C. whereupon it is cut with 1600 parts of xylene and filtered through a kieselguhr mat.

A mixture containing 1200 parts of freshly distilled methyl methacrylate, 600 parts of the above China-wood oil—"Amberol F-7" varnish, 1200 parts of xylene and 12 parts of benzoyl peroxide is heated with stirring for 2½ hours at 98-106° C. Unreacted methyl methacrylate monomer and most of the xylene is removed by distillation under reduced pressure, two 790 parts, portions of xylene being added in turn, to replace the methacrylate and xylene as it is removed. The resin solution is then reduced to a total weight of 1517 parts and consists of 40% of solid resin, approximately 51% of the resin being interpolymerized methyl methacrylate. Flowouts of the resin solution air dry to tack-free, clear, glossy and essentially colorless films in approximately 10 minutes, and show no tendency to frost or wrinkle. Upon baking 20 minutes at 100° C., clear, hard, tough and flexible films are obtained which possess good adhesion to wood and metals and excellent resistance to water, dilute aqueous acids, alkalis and alcoholic solutions.

A fast drying enamel which gives films of excellent durability may be prepared as follows: A mill base comprising 50 parts of titanium dioxide, 50 parts of antimony oxide and 55 parts of the 40% methyl methacrylate-China-wood oil varnish interpolymer solution obtained above and 40 parts of a cyclohexanone:toluene::2:1 mixture is ground in a ball mill for 64 hours. To the mill base is then added 195 parts more of the 40% resin solution and 40 parts of the cyclohexanonetoluene mixture. Grinding is then continued for a short time to insure thorough mixing. The enamel so obtained sprays and brushes readily and dries rapidly to glossy, hard, tough and adherent films of good build.

When interpolymerization of methyl methacrylate with China-wood oil is conducted in the same manner as described above, excepting for use of raw China-wood oil in place of the preformed China-wood oil—"Amberol F-7" varnish (i. e., by the method of U. S. Patent 1,975,959), the interpolymer contains only 37.5% of interpolymerized methyl methacrylate after 2 hours' heating, and 51% after 4 hours. Flowouts of the 51% methyl methacrylate interpolymer wrinkle badly on baking. After interpolymerization for 8½ hours, baked flowouts of the reaction mixture still exhibit excessive wrinkling and are brittle.

When methyl methacrylate is interpolymerized with a cold-blended, physical mixture of raw China-wood oil and 10% of "Amberol F-7" in place of a heat-blended, preformed China-wood oil—"Amberol F-7" (10%) varnish in the same ratio and by the process described above, a longer reaction period is also required (about 5½ hrs.) to give interpolymers of 50% methacrylate content. Films of this interpolymer and likewise films of interpolymers of 60% methacrylate content wrinkle badly on baking.

When blown China-wood oil was used in place of the preformed varnish the interpolymer contains 51% of interpolymerized methyl methacrylate only after 3⅔ hours, and baked films exhibit bad frosting and wrinkling.

Example II

A long oil varnish comprising 10 parts of rosin and 90 parts of raw China-wood oil is prepared by cooking the mixture of 225° C. for 15 minutes, cooling to 140° C., diluting with 100 parts of xylene and then filtering through a kieselguhr mat.

A mixture of 100 parts of the above China-wood oil-rosin varnish, 200 parts of methyl methacrylate, 200 parts of toluene and 2 parts of benzoyl peroxide is heated with stirring for one hour at 100° C. Analysis of the resin solution shows that 51% of the solid resin is interpolymerized methyl methacrylate. The unreacted methyl methacrylate monomer is removed as described in Example I, two 350 parts, portions of toluene being added in turn to replace that removed during the distillation. Flowouts of a 40% solution of the resin in toluene show no tendency to frost or wrinkle on baking or air drying, and give clear, tough, flexible and hard films which possess good adhesion and excellent resistance to water, dilute aqueous alkali and acid solutions.

Equally attractive interpolymers of methyl methacrylate with preformed China-wood oil varnishes may be obtained when small amounts of other natural or synthetic varnish gums such as ester gums, copals, oil soluble phenol-formaldehyde resins, etc., are used in place of "Amberol F-7" or rosin in the preparation of the varnishes described above.

Example III

A mixture of 500 parts of preformed China-wood oil—"Amberol F-7" (10%) varnish prepared as in Example I, 1000 parts of freshly distilled ethyl methacrylate, 1000 parts of xylene and 10 parts of benzoyl peroxide is heated with stirring for 2½ hours at 98-102° C. Analysis of the resin solution shows that 57% of the solid resin is interpolymerized ethyl methacrylate. Excess ethyl methacrylate is removed as described in Examples I and II, the interpolymer being isolated as a 40% solution in xylene. Flowouts of the resin solution dry rapidly at room temperature or on baking at 100° C. and give clear, tough, flexible films of excellent gloss, free from wrinkle or frost. Films of the interpolymer are somewhat softer than those of the methyl methacrylate-China-wood oil—"Amerol F-7" interpolymer described in Example I. Enamels prepared from this interpolymer give fast drying, tough, flexible, adherent films of excellent gloss.

Example IV

A mixture of 100 parts of China-wood oil—"Amberol F-7" (10%) varnish prepared as in Example I, 100 parts of freshly distilled methyl methacrylate, 100 parts of ethyl methacrylate, 200 parts of xylene and 2 parts of benzoyl peroxide is heated with stirring for 1¾ hours at 96-110° C. Fifty per cent of the solid resin consists of interpolymerized methyl and ethyl methacrylates. Flowouts of a 40% solution of the resin in xylene dry rapidly at 25° C. and at 100° C. to give clear, tough, glossy, adhesive films free from frost and of hardness intermediate between that of films of the methyl methacrylate-wood oil varnish and ethyl methacrylate-wood oil varnish interpolymers described in Examples I and III.

Example V

A mixture of 195.4 parts of China-wood oil—"Amberol F-7" (10%) varnish prepared as in Example I, 391 parts of isobutyl methacrylate, 391 parts of xylene and 3.9 parts of benzoyl peroxide is heated for 6½ hours at 100–103° C. The resinous product, which contains 60% of interpolymerized isobutyl methacrylate is isolated as a 40% solution in xylene. Flowouts of the resin solution dry rapidly at room temperature or on baking to give clear, flexible, tough and adhesive films of excellent gloss. Both baked and air dried films are somewhat softer and more thermoplastic than films of the ethyl methacrylate interpolymer.

An interpolymer which exhibits similar film properties is obtained in the same manner by using n-butyl methacrylate in place of isobutyl methacrylate in the initial reaction mixture.

Example VI

A mixture consisting of 500 parts of China-wood oil—"Amberol F-7" (10%) varnish prepared as in Example I, 500 parts of isobutyl methacrylate monomer, 500 parts of methyl methacrylate monomer, 1000 parts of xylene and 10 parts of benzoyl peroxide is heated with stirring for 2⅙ hours at 100–108° C. Analysis of the final solution shows that 56% of the solid resin consists of interpolymerized methyl and isobutyl methacrylates. Flowouts of the resin from a 40% solution in xylene dry tack free at room temperature in 10–15 minutes giving films of excellent gloss and good build. Both baked and air dried films are hard, tough, adhesive and free from wrinkle or frost and exhibit good resistance to water, dilute aqueous acids and alkalis.

A fast drying white enamel of the above interpolymer is prepared as follows: 100 parts of pigment comprising equal parts by weight of antimony oxide and titanium oxide is ground for four days in a ball mill with 250 parts of a 40% solution of the interpolymer in xylene, and 30 parts of a xylene:toluene mixture (1:1). The enamel so obtained sprays and brushes readily to give fast drying, hard, tough, flexible films of high gloss and good build.

Example VII

A long oil varnish comprising 180 parts of raw China-wood oil, 90 parts of raw linseed oil and 30 parts of "Amberol F-7" is prepared by cooling the mixture at 225–230° C. for 15 minutes, diluting with 300 parts of xylene after the product has cooled to 150° C., and filtering through a kieselguhr mat.

A mixture of 100 parts of the above China-wood oil-linseed oil—"Amberol F-7" varnish, 150 parts of freshly distilled methyl methacrylate, 150 parts of xylene and 1.5 parts of benzoyl peroxide is heated for 3¾ hours at 100–110° C. Fifty-one per cent of the resinous product is interpolymerized methyl methacrylate. Flowouts of a 40% solution of the interpolymer in toluene air dry rapidly to give clear, hard, tough flexible films which are free from wrinkle or frost.

Higher methacrylates such as ethyl, propyl and butyl methacrylates and various mixture of methacrylates used in place of methyl methacrylate likewise give highly useful interpolymers with preformed China-wood oil-linseed oil-resin varnishes.

Example VIII

A mixture of 100 parts of preformed China-wood oil—"Amberol F-7" (10%) varnish prepared as in Example I, 100 parts of methyl methacrylate, 100 parts of styrene, 200 parts of xylene and 2 parts of benzoyl peroxide is heated for 2⅓ hours at 118–126° C. Analysis of the solution shows that 51% of the resin consists of interpolymerized styrene and methyl methacrylate. Both baked and air dried films are clear, hard, tough and free from wrinkle or frost and show excellent resistance to water, dilute aqueous acid and alkali solution.

Example IX

Fifth parts of a 50 per cent xylene solution of preformed China-wood oil—"Amberol F-7" varnish, 100 parts methyl acrylate, 100 parts xylene and 2 parts benzoyl peroxide are heated with stirring at 90–96° C. for 4⅓ hours. Flowouts of the resin solution when baked for 15 minutes at 100° C. give clear, tough, glossy and tack-free films which exhibit good adhesion to steel and are free from wrinkle or frost. Analysis of the resin solution by determination of the solids content shows that the interpolymer contains 28.5 per cent of polymerized methyl acrylate.

In the above examples, certain varnishes have been disclosed but the process of the present invention is applicable to any heat-blended frosting drying oil-varnish gum varnish. These varnishes are prepared by cooking, i. e., heat-blending according to standard varnish making practice, a "frosting" oil such as China-wood oil with 5 to 30% by weight of varnish gum at an elevated temperature prior to interpolymerization with the alpha methylene open-chain aliphatic monocarboxylic acid ester. While the examples illustrate the use of the most important frosting drying oil, i. e., China-wood oil, the varnishes may also be made from any other frosting drying oil, e. g., oitica oil, Japanese-wood oil, etc., which are characterized by their tendency to frost or wrinkle on drying. In the preparation of these varnishes any of the various blown or heat bodied modifications of the frosting oils may be used in place of the raw oils. The invention is also applicable to varnishes comprising two or more frosting oils (e. g., mixtures of China-wood and oiticica oil or the like), or to varnishes comprising mixtures of frosting oils with raw or bodied non-frosting drying or semi-drying oils (e. g., linseed, soya bean or castor oil or the like plus China-wood oil). The frosting oils are, of course, present in proportions such that the drying oil combination exhibits frosting properties on drying.

As varnish gum there may be used oil-soluble natural or synthetic resins such as rosin, copals, phenol-formaldehyde resins, phenolic modified ester gums (known in the trade as "Amberols"), cumarone-indene resins and the like. China-wood oil varnishes containing 10% of a resin known commercially as Bakelite XR—254 or of a resin known commercially as Super Beckacite 1001 (100% phenol-formaldehyde resins), ester gums or 10% of a resin known commercially as "Amberol 801" (a rosin-maleic anhydride glyceride) give interpolymers with methyl methacrylate equally as desirable as those described in Examples I and II prepared from China-wood oil—"Amberol F-7" or China-wood oil-rosin varnishes. Mixtures of two or more gums may be used. The use of low proportions (i. e., 5–30%) of varnish gum in the varnish compositions is preferred, but the invention is applicable to oil-gum compositions wherein the gum comprises 5–50% of the mixture. The higher proportions of gum, i. e., 30–50%, generally tend to promote brittleness and it is usually preferred in such cases to decrease the amount of alpha methylene open-chain monocarboxylic acid esters in the final interpolymer.

The varnishes which are to be interpolymerized with the esters of alpha methylene open-chain aliphatic carboxylic acids may be heat-blended at temperatures of 175–260° C. for a time dependent on the temperature, a longer time being used for lower temperatures, a shorter time for higher temperatures. For any given composition and temperature, the varnish may be heat-blended for a number of different lengths of time. The oil-gum ratio, type of oil, type of gum, etc., all play a part. The optimum cooking schedule is, however, best determined by trial.

The examples illustrate preferred compositions, but any polymerizable ester of an alpha methylene open-chain aliphatic monocarboxylic acid having the following formula

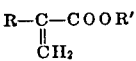

where R=hydrogen
halogen
alkyl
aryl
and R′=alkyl
cycloalkyl will give valuable interpolymers with preformed frosting drying oil varnishes by the process outlined. Interpolymers comprising methyl methacrylate give somewhat harder films than interpolymers comprising the higher esters such as ethyl, normal propyl, isopropyl, normal butyl, octyl, dodecyl, octadecyl, furfuryl, phenyl, isobutyl and cyclohexyl acrylates and methacrylates. On the other hand, films of interpolymers comprising the higher esters exhibit a gloss somewhat superior to that of films of interpolymers of methyl methacrylate. Other esters include β-methoxyethyl, 2-nitropropyl, benzyl, 2-methyl-2-nitropropyl, β-cyanoethyl acrylates and methacrylates. α-Chloroacrylic and α-phenylacrylic acid esters may also be used. The ester of the alpha methylene monocarboxylic acid has the general formula

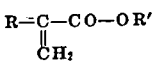

wherein R is hydrogen, alkyl, aryl, or halogen and COOR′ is an esterified carboxyl group. Mixtures of two or more esters of alpha methylene open-chain aliphatic monocarboxylic acid in the initial reaction mixture may be used, for example, methyl methacrylate and methyl acrylate. If desired, other interpolymerizable monomers such as styrene (Example VIII), vinyl acetate, methyl vinyl ketone, vinyl chloride, maleic anhydride, and the like, may be incorporated in the initial reaction mixture. In general, however, it is preferable to have the esters of alpha methylene open-chain aliphatic monocarboxylic acids present in major proportions. The invention is not, however, limited to the final compositions of these interpolymers as set forth in the examples since for certain uses it is sometimes desirable to prepare interpolymers comprising greater or smaller amounts of the polymerized alpha methylene monocarboxylic acid esters. For most film-forming purposes, it is preferable that the final products contain 45–60% of the interpolymerized alpha methylene monocarboxylic acid esters. However, the preferred proportion of alpha methylene monocarboxylic acid ester in the final interpolymer will vary somewhat depending on the varnish selected as well as the particular use for which the interpolymer is intended. Interpolymers containing larger amounts of the alpha methylene monocarboxylic acid esters are especially valuable for molding compositions.

The ratio of alpha methylene monocarboxylic acid ester monomer to varnish in the initial reaction mixture may be varied over wide limits and valuable interpolymers likewise obtained. However, an excess of polymerizable ester is preferably used in the initial reaction mixture (e. g., a 4:1 polymerizable ester:oil-gum ratio by weight) and the polymerization is stopped at the desired stage, the excess polymerizable ester being thereafter removed and recovered, e. g., by vacuum distillation. Higher initial ratios, e. g., 5:1, 6:1, 8:1, etc. serve only to shorten the period of reaction required to give the desired interpolymers; lower ratios, e. g., 3:1 or 2:1, etc. tend to prolong the period of interpolymerization required to give the final desired product.

The polymerization of esters of alpha methylene open-chain aliphatic monocarboxylic acids with preformed varnishes is preferably conducted in the presence of inert solvents such as xylene, toluene, benzene or other organic diluents which serve as solvents for both the reactants and products. In the examples, reaction mixtures comprising 50% of inert solvent were used, but equally satisfactory interpolymers are obtained with greater or smaller amounts of solvent present in the initial reaction mixture. Large amounts of solvent tend to slow down the reaction while smaller amounts of solvent result in the same products after shorter periods of interpolymerization. The reaction may be carried out in the absence of such solvents, especially when a large excess of the alpha methylene monocarboxylic acid ester monomers are used, but the reaction is more difficultly controlled and the products are more apt to gel in the absence of solvent.

The invention is not limited to the operating conditions such as temperatures and pressures which were chosen in the examples, for the temperature and pressure may be varied over relatively wide limits and equally satisfactory interpolymers are obtained. Thus, the reaction may be carried out at subatmospheric pressure, atmospheric pressure or at superatmospheric pressure at temperatures varying from 85–150° C.

While the examples disclose benzoyl peroxide as the catalyst, any catalyst effective to polymerize alpha methylene open-chain aliphatic monocarboxylic acids may be used including other peroxide catalysts, ozone, actinic light, boron trifluoride, and certain acidic salts such as stannic chloride and the like. Interpolymers which exhibit equally satisfactory properties may be obtained by heat treatment alone in the absence of catalysts, but generally this procedure is more lengthy.

The new interpolymers of alpha methylene open-chain aliphatic mono-carboxylic acid esters with preformed frosting oil varnishes described herein are highly useful as coating compositions. Films of the resins air dry or bake rapidly, apparently chiefly by solvent evaporation at first followed by further polymerization on aging. Driers may be added if desired. The resin solutions may be sprayed or brushed to give films which after drying are clear, flexible, tough, adherent and which exhibit high build, excellent gloss and good resistance to water, dilute aqueous acid and alkali solutions. If desired, plasticizers or certain natural or synthetic resins may be incorporated to modify the properties of these interpolymers. Pigments may be readily dispersed in these resins to give enamels of good gloss which likewise possess the attractive film-forming properties of the unmodified interpolymers. The products are highly useful therefore as coatings for textiles, cloth and fabrics, transparent films, papers, wood, leather, metals, stone, brick, cement, glass, and wire, etc. The resins are further useful as molding compositions or as binders for fillers, pigments, dyes and the like.

By the process of this invention esters of alpha methylene open-chain aliphatic monocarboxylic acid can be interpolymerized with frosting oil-resin varnishes to give soluble resinous materials characterized by excellent film-forming properties. These new alpha methylene monocarboxylic acid ester frosting oil varnish interpolymers exhibit marked improvements over frosting oil-alpha methylene monocarboxylic acid ester interpolymers hitherto known in such important respects as rate of interpolymer formation and resistance to frosting or wrinkling on drying. In the new process of this invention, the esters of alpha methylene open-chain aliphatic monocarboxylic acids are interpolymerized with preformed, heat-blended drying oil-resin varnishes and not merely with the raw or bodied drying oils themselves or physical mixtures (cold blends) of the drying oils and resins.

The term "alkyl" in the claims includes in its scope the term "cycloalkyl."

The above description and examples are intended to be illustrative only. Any modification of or variation therefrom which conforms to the spirit of the invention is intended to be included within the scope of the claims.

What is claimed is:

1. An interpolymer of a preformed heat-blended frosting drying oil-varnish gum varnish with a polymerizable ester of an alpha-methylene open-chain aliphatic monocarboxylic acid.

2. An interpolymer of a preformed heat-blended frosting drying oil-varnish gum varnish with a polymerizable alkyl ester of a alpha-methylene open-chain aliphatic monocarboxylic acid.

3. An interpolymer of a preformed heat-blended frosting drying oil-varnish gum varnish with an alkyl methacrylate.

4. An interpolymer of a preformed heat-blended frosting drying oil-varnish gum varnish with methyl methacrylate.

5. An interpolymer of a preformed heat-blended China-wood oil-varnish gum varnish with a polymerizable ester of an alpha-methylene open-chain aliphatic monocarboxylic acid.

6. An interpolymer of a preformed heat-blended China-wood oil-varnish gum varnish with a polymerizable ester of methacrylic acid.

7. An interpolymer of a preformed heat-blended China-wood oil-varnish gum varnish with a polymerizable alkyl methacrylate.

8. An interpolymer of a preformed heat-blended China-wood oil-varnish gum varnish with methyl methacrylate.

9. An interpolymer of a preformed heat-blended China-wood oil-varnish gum varnish with methyl acrylate.

10. An interpolymer of a preformed heat-blended frosting drying oil-varnish gum varnish, containing 5–30%, based on the weight of the oil, of the varnish gum, with a polymerizable ester of an alpha-methylene open-chain aliphatic monocarboxylic acid.

11. An interpolymer of a preformed heat-blended frosting drying oil-varnish gum varnish, containing 5–30%, based on the weight of the oil, of the varnish gum, with a polymerizable alkyl ester of an alpha-methylene open-chain aliphatic monocarboxylic acid.

12. An interpolymer of a preformed heat-blended frosting drying oil-varnish gum varnish, containing 5–30%, based on the weight of the oil, of the varnish gum, with an alkyl methacrylate.

13. An interpolymer of a preformed heat-blended frosting drying oil-varnish gum varnish, containing 5–30%, based on the weight of the oil, of the varnish gum, with methyl methacrylate.

14. An interpolymer of a preformed heat-blended China-wood oil-varnish gum varnish, containing 5–30%, based on the weight of the oil, of the varnish gum, with a polymerizable ester of an alpha-methylene open-chain aliphatic monocarboxylic acid.

15. An interpolymer of a preformed heat-blended China-wood oil-varnish gum varnish, containing 5–30%, based on the weight of the oil, of the varnish gum, with a polymerizable ester of methacrylic acid.

16. An interpolymer of a preformed heat-blended China-wood oil-varnish gum varnish, containing 5–30%, based on the weight of the oil, of the varnish gum, with a polymerizable alkyl methacrylate.

17. An interpolymer of a preformed heat-blended China-wood oil-varnish gum varnish, containing 5–30%, based on the weight of the oil, of the varnish gum, with methyl methacrylate.

18. An interpolymer of a preformed heat-blended China-wood oil-varnish gum varnish, containing 5–30%, based on the weight of the oil, of the varnish gum, with methyl acrylate.

19. An interpolymer of methyl methacrylate and isobutyl methacrylate with a preformed heat-blended China wood oil-varnish gum varnish, containing 5–30% based on the weight of the oil, of the varnish gum.

20. An interpolymer of ethyl methacrylate with a preformed heat-blended China-wood oil-varnish gum varnish, containing 5–30% based on the weight of the oil, of the varnish gum.

ROBERT BARNETT FLINT.
HENRY SHIRLEY ROTHROCK.

CERTIFICATE OF CORRECTION.

Patent No. 2,276,176. March 10, 1942.

ROBERT BARNETT FLINT, ET AL.

It is hereby certified that error appears in the printed specification of the above numbered patent requiring correction as follows: Page 3, second column, line 16, for "Fifth" read --Fifty--; line 42, for "oitica" read --oiticica--; and line 50, for "ond" read --and--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.